F. C. GEISDORF.
SPRING TIRE.
APPLICATION FILED MAY 20, 1920.
1,386,564.
Patented Aug. 2, 1921.
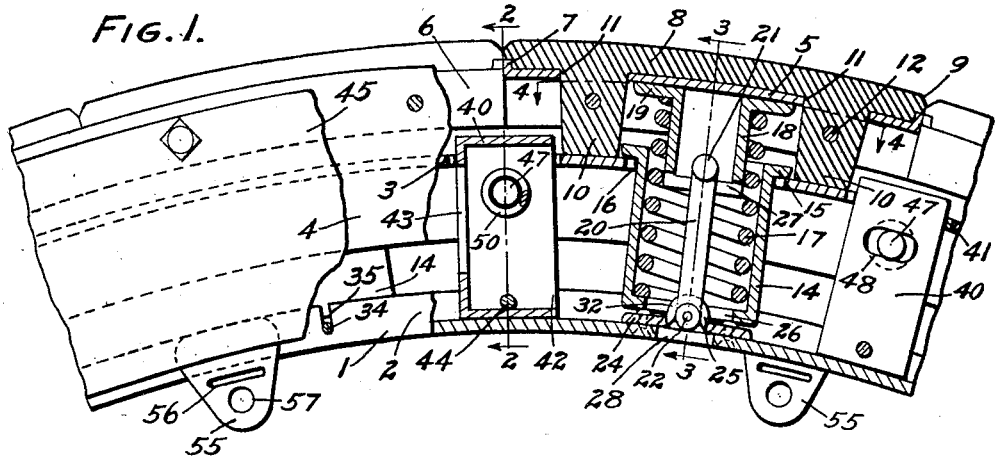
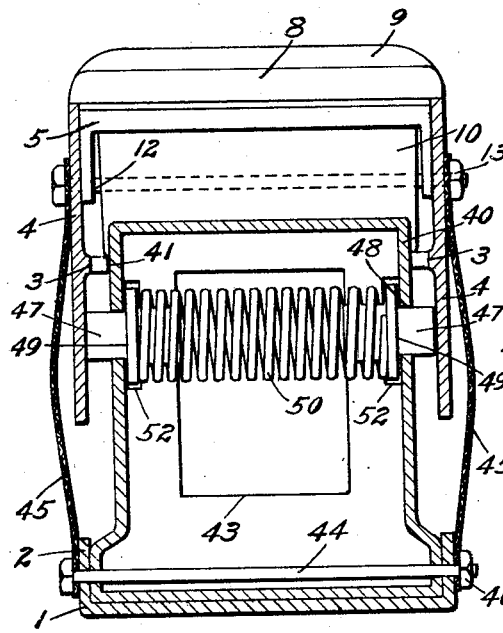
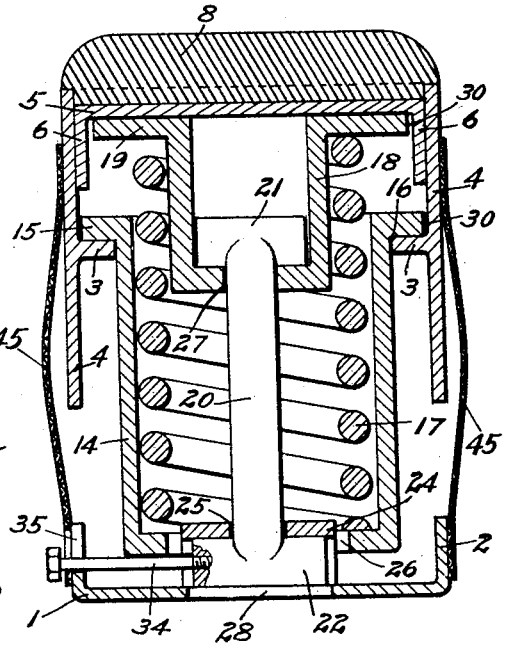
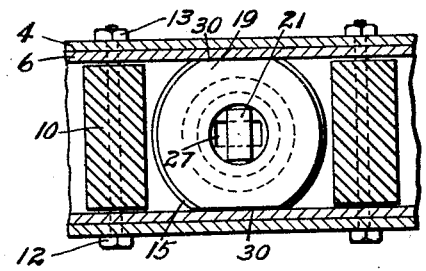
INVENTOR
FRANK C. GEISDORF
BY
Hazard & Miller
ATTORNEYS.

UNITED STATES PATENT OFFICE.

FRANK C. GEISDORF, OF LOS ANGELES, CALIFORNIA.

SPRING-TIRE.

1,386,564.　　　　　Specification of Letters Patent.　　Patented Aug. 2, 1921.

Application filed May 20, 1920. Serial No. 382,743.

*To all whom it may concern:*

Be it known that I, FRANK C. GEISDORF, a citizen of the United States, residing at Los Angeles, in the county of Los Angeles and State of California, have invented new and useful Improvements in Spring-Tires, of which the following is a specification.

This invention is a spring tire which may be used instead of a usual pneumatic tire upon automobiles and the like, and has for its object the provision of a tire which will be of the desired resiliency without necessitating the employment of pneumatic tubes and the like.

The invention will be readily understood from the following description of the accompanying drawings, in which—

Figure 1 is a side elevation of a portion of a tire constructed in accordance with the invention and partly broken away.

Fig. 2 is a transverse section on the line 2—2 of Fig. 1.

Fig. 3 is a transverse section on the line 3—3 of Fig. 1.

Fig. 4 is a detail section on the line 4—4 of Fig. 1.

The improved tire comprises a base, a tread support, an intermediate member secured to the tread support and a plurality of springs arranged between the base and the tread support providing a resilient connection between the tread support of the tire and its base.

The base of the tire is shown as an annular channel iron 1 having the flanges 2 of the channel iron upturned. This base is arranged to be mounted upon a wheel in any well known or preferred manner. An intermediate member, forming a support for the tread carrying portion of the tire, surrounds the base 1 in spaced relation therefrom, this intermediate member being shown as an I bar having its web 3 surrounding the base 1 and its flanges 4 extending in radially spaced relation beyond the base 1 substantially in alinement with the side edges of the base.

The tread support for the tire is shown as a channel bar having its base 5 received between the outer edges of flanges 4 with the flanges 6 of this channel bar turned inwardly and resting against the inner surfaces of the flanges 4. The channel bar forming the tread support is, preferably, made in a plurality of circumferential sections, preferably, provided with outturned ends 7 at their meeting ends. The tread of the tire comprises a plurality of tread sections arranged to be secured to the respective sections of the tread support. These tread sections may be blocks of rubber 8, each extending the length of a section of the tread support, with their ends, preferably, beveled as shown at 9 to provide a slight space between adjacent tread blocks. The sides of the tread blocks, preferably, extend outwardly over the edges of the flanges 4 as clearly shown in Fig. 2. Lugs 10 are, preferably, provided upon the inner side of a tread block adjacent its respective ends, these lugs being arranged to extend inwardly through suitable openings 11 formed in the base 5 with the inner ends of the lugs resting upon the web 3. The tread supports and the tread blocks may be held in position between the flanges 4 by bolts 12 extending transversely of the tire through suitable openings in the lugs of the tread blocks and in the flanges 6 and 4. Usual nuts 13 are provided upon the ends of these bolts.

The resilient support provided between the base of the tire and the tread carrying portion thereof is shown as comprising a cup 14 having a flange 15 at its outer end resting against the web 3 with the cup extending inwardly through a suitable opening 16 in the web toward the base of the tire 1. The opening 16 is of such size as to permit circumferential movement of the web relative to cup 14. A spring 17 shown as a coil spring is received within the cup 14 with one end of the spring resting against the base of the cup and the other end of the spring extending beyond the flange 15 upon the cup and supporting a cup 18, arranged to telescope within cup 14 and having a flange 19 at its outer end resting upon the end of spring 17. The flange 19 abuts against the inner surface of a section of the tread support so as to provide a yieldable support for the tread carrying section, it being understood, that one of the springs 17 and cups 14 and 18 are arranged at each of the sections of the tread support between the lugs 10 of the tread block carried by the section of the tread support. The cup 18 is connected to the base of the tire by a rod 20 projecting radially beyond the base of the tire within the convolutions of the spring and into the cup 18. The rod 20 is provided at its opposite ends with cross heads 21 and 22, the former of which rests against the base of cup 18 and the latter of which is received against the base 1. The cross head 22 is, preferably, journaled in a bearing bracket 24 fixed upon the base 1, the rod 20 extending outwardly through a suitable opening 25 in this bearing bracket and through an opening 26 in the base of cup 14. The base of cup 18 is provided with an opening 27 through which rod 20 is received, this opening being shown as an elongated slot through which cross head 21 is arranged to pass when the rod 20 is turned to bring the cross head in alinement with the slot. After the cross head has been passed through slot 27, the rod 20 is turned so that the cross head 21 will rest against the base of cup 18 at the sides of slot 27 so as to hold the parts in their assembled position. A slot 28 in alinement with slot 27 is provided in base 1 so that in assembling the parts, the rod 20 may be inserted through slot 28 and the outer end of the rod then passed through slot 27 and the rod then given a quarter turn for retaining the parts in their assembled relation as shown in Figs. 1 and 3.

The flanges 15 and 19 of cups 14 and 18 are, preferably, of sufficient width as to cause the flange to extend entirely across the space between the opposite side flanges of the construction, the edges of the flanges which are adjacent the flanges 4 and 6 being, preferably, formed as straight sides 30, arranged to abut against flanges 4 and 6 for preventing turning of cups 14 and 18 after assembly of the parts. In order that the presence of a broken spring within the tire will be indicated, a pin 34, preferably, projects beyond cross head 22 through a suitable notch 35 in one of the flanges 2. If, now, one of the springs 17 is broken, the rod coöperating with the broken spring will be free to vibrate in its bearing bracket 24, and this vibration of the rod will cause a similar vibration of pin 34 which will indicate the presence of a broken spring.

Positioning means are, preferably, provided between the base of the tire and the web 3 at points intermediate of adjacent cups 14. These positioning means each comprise a frame shown as a rectangular box frame 40 resting upon the base 1 between flanges 2 and extending outwardly therefrom in spaced relation from the flanges 4 of web 3 and through a suitable opening 41 in web 3. The opening 41 is of suitable size to permit of slight circumferential and lateral movement of web 3 relative to the box frame. One of the end side walls of this box frame is, preferably, open as shown at 42 and the opposite end side wall of the frame may be provided with a central aperture 43 for reducing the weight of the construction. The frame is supported upon base 1 by a bolt 44 extending through the frame and through the opposite flanges 2 of base 1. Protecting means for preventing the entrance of mud into the tire are, preferably, arranged at each side of the tire, these protecting means comprising annular fabric strips 45 secured at their respective edges beneath the heads of bolts 12 and 44 and the nuts 13 of bolts 12 and nuts 46 of bolts 44.

Laterally yieldable cushioning connections are, preferably, provided between frames 40 and the flange of web 3 to permit of a slight lateral movement of the yieldable portion of the tire relative to the fixed portion of the tire. As an instance of this arrangement, pins 47 may extend through suitable slots 48 in the respective side walls of frame 40, the slots 48 being, preferably, somewhat elongated circumferentially of the tire to permit of circumferential movement of pins 47. Shoulders 49 are provided upon pins 47, these shoulders being arranged to abut against the inner surfaces of the side walls of frame 40, and a coil spring 50 extends across the frame 40 with its respective ends received around pins 47, so as to abut against the shoulders 49. By this arrangement, pins 47 are yieldably urged outwardly into abutment against the depending flanges 4. The tread carrying portion of the tire is thus arranged for slight resilient lateral movement relative to frame 40. The end side wall of frame 40 is, preferably, provided with slots 52 in alinement with shoulders 49 to permit of circumferential movement of pins 47 relative to the frame 40 without causing abutment of the shoulders 49 against the wall of frame 40.

It will be observed that the construction as thus described provides a tire comprising a base portion and a tread portion resiliently mounted on the base portion. It will also be observed that the base portion carries supporting frames having a yieldable connection with the tread portion for permitting slight movement of the latter relative to the supporting frames. It will also be noted that the improved tire construction provides a plurality of resilient connections between the base of the tire and the tread portion, these resilient connections being individually removable should one of the same be broken.

The improved tire as thus constructed may be mounted upon the rim of a wheel in any well known or preferred manner. In the practical embodiment of the invention as illustrated in the drawings, I have shown a plurality of lugs 55 depending from the base of the tire, preferably, from one of the flanges of said base. These lugs may be suitably riveted or otherwise secured to the flange and are shown as provided with an elongated slot 56 through which the usual wedge of an attaching lug may be received. An aperture 57 is, preferably, also formed through the lug 55 to receive a usual bolt for connecting the lug to the usual attaching means.

It will be apparent that various changes may be made in the construction as thus described without departing from the spirit of the invention.

What is claimed is:

1. A tire of the character described comprising a base; a tread portion spaced radially beyond said base; an intermediate annular member supporting cups extending outwardly from said base and supported by said intermediate member; and tread supports within said supporting cups yieldably urged outwardly therefrom against said tread portion.

2. A tire of the character described comprising a base; a tread portion spaced radially beyond said base; means for yieldably urging said tread portion outwardly from said base; supporting frames upon said base; and laterally yieldable positioning means between said frames and said tread portion of the tire.

3. A tire of the character described comprising a base; a tread portion spaced radially beyond said base; supporting cups extending outwardly from said base; and tread supports within said supporting cups yieldably urged outwardly therefrom against said tread portion; supporting frames on said base; and laterally yieldable connections between said supporting frames and the tread portion of said tire.

4. A tire of the character described comprising a base; an intermediate member spaced radially beyond said base; a tread portion supported upon said intermediate member; supporting cups extending inwardly from said intermediate member toward said base; supporting members within said cups received against the inner surface of said tread portion; springs within said supporting cups between said supporting members and the bases of said supporting cups; and connecting rods supported upon the base of the tire and extending within said supporting members.

5. A tire of the character described comprising a base; an intermediate member spaced radially beyond said base; a tread portion supported by said intermediate member, supporting cups extending inwardly from said intermediate member toward said base, supporting cups received within said first mentioned supporting cups and abutting against the inner surface of said tread portion; coil springs between said inner supporting cups and the bases of said first mentioned supporting cups; connecting rods having cross heads at the ends thereof; bearings upon the base of said tire; one of the cross heads of the connecting rod being journaled in one of said bearings, the other cross head of each connecting rod being received in one of said inner supporting cups; the bases of said inner supporting cups having slots for receiving said cross heads and arranged to retain said cross heads within said cups by turning said cross heads at right angles to said slots.

6. A tire of the character described comprising a base; an intermediate member spaced radially beyond said base; a tread portion supported upon said intermediate member; supporting cups extending inwardly from said intermediate member toward said base; supporting members within said cups received against the inner surface of said tread portion; springs within said supporting cups between said supporting members and the bases of said supporting cups; and connecting rods supported upon the base of the tire and extending within said supporting members; and a visual indicator comprising a pin extending from each of said connecting rods beyond the base of the tire.

In testimony whereof I have signed my name to this specification.

FRANK C. GEISDORF.